United States Patent
Gill

(10) Patent No.: US 7,218,488 B2
(45) Date of Patent: May 15, 2007

(54) METHOD AND APPARATUS FOR REDUCING THE THICKNESS OF A SENSOR STACK IN A CURRENT-PERPENDICULAR-TO-PLANE GMR/TUNNEL VALVE SENSOR

(75) Inventor: Hardayal Singh Gill, Palo Alto, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 436 days.

(21) Appl. No.: 10/811,526

(22) Filed: Mar. 29, 2004

(65) Prior Publication Data

US 2005/0213264 A1 Sep. 29, 2005

(51) Int. Cl.
G11B 5/39 (2006.01)
(52) U.S. Cl. .............. 360/324.12; 360/324.2
(58) Field of Classification Search ............. 360/324.2, 360/324.12
See application file for complete search history.

(56) References Cited

U.S. PATENT DOCUMENTS

| | | |
|---|---|---|
| 6,219,208 B1 | 4/2001 | Gill |
| 6,295,187 B1 | 9/2001 | Pinarbasi |
| 6,317,298 B1 | 11/2001 | Gill |
| 6,556,391 B1 * | 4/2003 | Aoshima et al. ........ 360/324.12 |
| 6,650,513 B2 * | 11/2003 | Fullerton et al. ........ 360/324.2 |
| 6,751,073 B2 * | 6/2004 | Hasegawa ................ 360/324.2 |
| 6,856,494 B2 * | 2/2005 | Ooshima et al. ........ 360/324.12 |
| 7,092,221 B2 * | 8/2006 | Gill ........................ 360/324.11 |
| 2001/0004798 A1 | 6/2001 | Gill |
| 2002/0097535 A1 * | 7/2002 | Ito et al. ................. 360/324.2 |
| 2003/0086217 A1 | 5/2003 | Pinarbasi |

* cited by examiner

Primary Examiner—Jefferson Evans
(74) Attorney, Agent, or Firm—David W. Lynch; Chambliss Bahner & Stophel

(57) ABSTRACT

A method and apparatus for reducing the thickness of a sensor stack in a current-perpendicular-to-plane (CPP) GMR/tunnel valve (TV) sensor is disclosed. A layer of alpha-$Fe_2O_3$ having a high coercivity is formed adjacent the active areas for pinning the bias layer.

21 Claims, 8 Drawing Sheets

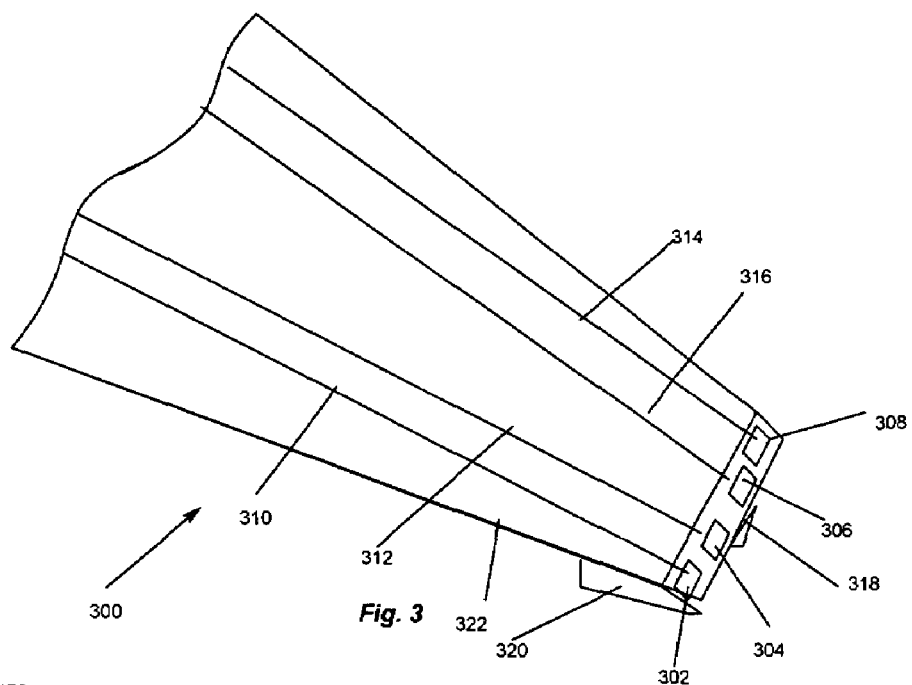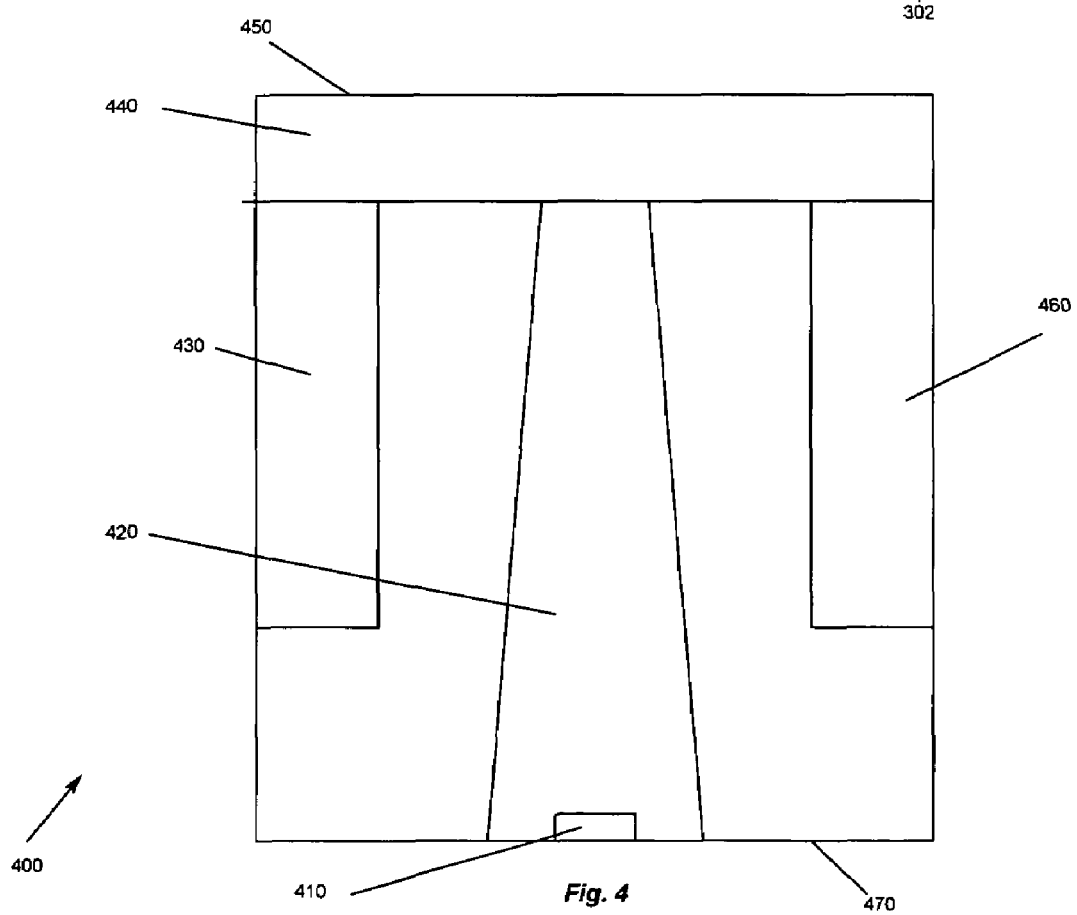

METHOD AND APPARATUS FOR REDUCING THE THICKNESS OF A SENSOR STACK IN A CURRENT-PERPENDICULAR-TO-PLANE GMR/TUNNEL VALVE SENSOR

BACKGROUND OF THE INVENTION

1. Field of the Invention

This invention relates in general to magnetic sensors, and more particularly to a method and apparatus for reducing the thickness of a sensor stack in a current-perpendicular-to-plane (CPP) GMR/tunnel valve (TV) sensor.

2. Description of Related Art

Magnetic recording is a key segment of the information-processing industry. While the basic principles are one hundred years old for early tape devices, and over forty years old for magnetic hard disk drives, an influx of technical innovations continues to extend the storage capacity and performance of magnetic recording products. For hard disk drives, the areal density or density of written data bits on the magnetic medium has increased by a factor of more than two million since the first disk drive was used for data storage. Areal density continues to grow due to improvements in magnetic recording heads, media, drive electronics, and mechanics.

Magnetic recording heads have been considered the most significant factor in areal-density growth. The ability of the magnetic recording heads to both write and subsequently read magnetically recorded data from the medium at data densities well into the gigabits per square inch (Gbits/in$^2$) range gives hard disk drives the power to remain the dominant storage device for many years to come.

Important components of computing platforms are mass storage devices including magnetic disk and magnetic tape drives, where magnetic tape drives are popular, for example, in data backup applications. Write and read heads are employed for writing magnetic data to and reading magnetic data from the recording medium. The read and write heads are connected to processing circuitry that operates according to a computer program to implement the writing and reading functions.

A magnetoresistive (MR) sensor changes resistance in the presence of a magnetic field. Recorded data can be read from a recorded magnetic medium, such as a magnetic disk, because the magnetic field from the recorded magnetic medium causes a change in the direction of magnetization in the read element, which causes a corresponding change in the sensor resistance.

A magnetoresistive (MR) sensor detects magnetic field signals through the resistance changes of a sensing element as a function of the strength and direction of magnetic flux being sensed by the sensing element. Conventional MR sensors, such as those used as MR read heads for reading data in magnetic recording disk and tape drives, operate on the basis of the anisotropic magnetoresistive (AMR) effect of the bulk magnetic material, which is typically permalloy. A component of the read element resistance varies as the square of the cosine of the angle between the magnetization direction in the read element and the direction of sense current through the read element. Recorded data can be read from a magnetic medium, such as the magnetic disk in a magnetic disk drive, because the external magnetic field from the recorded magnetic medium (the signal field) causes a change in the direction of magnetization in the read element, which in turn causes a change in resistance of the read element. This change in resistance may be used to detect magnetic transitions recorded on the recording media.

In the past several years, prospects of increased storage capacity have been made possible by the discovery and development of sensors based on the giant magnetoresistance (GMR) effect, also known as the spin valve effect. In a spin valve sensor, the GMR effect varies as the cosine of the angle between the magnetization of the pinned layer and the magnetization of the free layer. Magnetic sensors utilizing the GMR effect are found in mass storage devices such as, for example, magnetic disk and tape drives and are frequently referred to as spin valve sensors. In operation, a sense current is caused to flow through the read head and therefore through the sensor. The magnetic flux from the disc causes a rotation of the magnetization vector in at least one of the sheets, which in turn causes a change in the overall resistance of the sensor. As the resistance of the sensor changes, the voltage across the sensor changes, thereby producing an output voltage.

Recent hard disk drive designs have utilized the Current In-Plane (CIP) structure, where the sense current travels between the magnetic shields parallel to the sensor plate. Such a design has produced optimism that areal densities of 100 Gbits/in$^2$ are possible, However, research efforts continue to find even better read heads so that areal densities may be boosted into the many hundreds of Gbits/in$^2$ range.

One such discovery is the Current-Perpendicular-to-Plane (CPP) structure, whereby the sense current travels from one magnetic shield to the other, perpendicular to the sensor plate. The CPP head provides an advantage over the CIP head because as the sensor size becomes smaller, the output voltage of a CPP head becomes larger, thus providing an output voltage that is inversely proportional to the square root of the sensor area.

One of the candidates for realizing high sensitivity using the CPP structure is the Tunnel-Magneto-Resistive (TMR) head. In a TMR head, the magnitude of the tunneling current, in the gap between two ferromagnetic metals, is dependent upon the electron's spin directions or polarizations. Another candidate for the CPP structure uses a multilayer GMR structure that exhibits a large output signal.

The GMR sensor is continuously being scaled down to increase areal density. To meet targeted giant magnetoresistive (GMR) head aerial density requirements, designers are always looking for ways to make the sensor thinner, shorter and narrower. For example, if a CPP structure is used in-gap type read heads for high-density recording, the sensor films must be thinner than the read gap.

It can be seen that there is a need for a method and apparatus for reducing the thickness of a sensor stack in a current-perpendicular-to-plane (CPP) GMR/tunnel valve (TV) sensor.

SUMMARY OF THE INVENTION

To overcome the limitations described above, and to overcome other limitations that will become apparent upon reading and understanding the present specification, the present invention discloses a method and apparatus for reducing the thickness of a sensor stack in a current-perpendicular-to-plane (CPP) GMR/tunnel valve (TV) sensor.

The present invention solves the above-described problems by forming a layer of alpha-$Fe_2O_3$ adjacent the active areas for pinning the bias layer.

A CPP GMRI TV sensor in accordance with the principles of the present invention includes a sensor stack having a free layer forming an active area, a spacer layer formed over the free layer of the sensor stack, a biasing layer disposed over the spacer and a high coercivity layer formed adjacent the sensor stack for pinning the biasing layer, the biasing layer maintaining a direction of magnetization in the free layer until influenced by a readback field.

In another embodiment of the present invention, a magnetic storage system is provided. The magnetic storage system includes a magnetic storage medium having a plurality of tracks for recording of data and a CPP GMR/TV sensor maintained in a closely spaced position relative to the magnetic storage medium during relative motion between the magnetic transducer and the magnetic storage medium, the CPP GMR/TV sensor further including a sensor stack having a free layer forming an active area, a spacer layer formed over the free layer of the sensor stack, a biasing layer disposed over the spacer and a high coercivity layer formed adjacent the sensor stack for pinning the biasing layer, the biasing layer maintaining a direction of magnetization in the free layer until influenced by a readback field.

In another embodiment of the present invention, a method for reducing the thickness of a sensor stack in a CPP GMR/TV sensor is provided. The method includes forming a sensor stack seed layer, forming, over the sensor stack seed layer, a sensor stack having a free layer, a spacer and a pinned layer, forming a spacer over the free layer of the sensor stack, forming a bias layer over the spacer, adjacent to the sensor stack, forming a high coercivity layer for pinning the bias layer, forming a passive area seed layer over the high coercivity layer, forming a layer of Ta over the bias layer and the passive area seed layer, removing the Ta layer even with the bias layer, forming, over the bias layer and the passive area seed layer, a coupling layer for pinning the biasing layer, the biasing layer maintaining a direction of magnetization in the free layer until influenced by a readback field and forming a cap over the coupling layer.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout:

FIG. 3 illustrates a slider mounted on a suspension according to an embodiment of the present invention;

FIG. 4 illustrates an ABS view of the slider and the magnetic head according to an embodiment of the present invention;

DETAILED DESCRIPTION OF THE INVENTION

In the following description of the embodiments, reference is made to the accompanying drawings that form a part hereof, and in which is shown by way of illustration the specific embodiments in which the invention may be practiced. It is to be understood that other embodiments may be utilized because structural changes may be made without departing from the scope of the present invention.

The present invention provides a method and apparatus for reducing the thickness of a sensor stack in a current-perpendicular-to-plane (CPP) GMR/tunnel valve (TV) sensor. A layer of alpha-$Fe_2O_3$ having a high coercivity is formed adjacent the active areas for pinning the bias layer.

Figure 1:
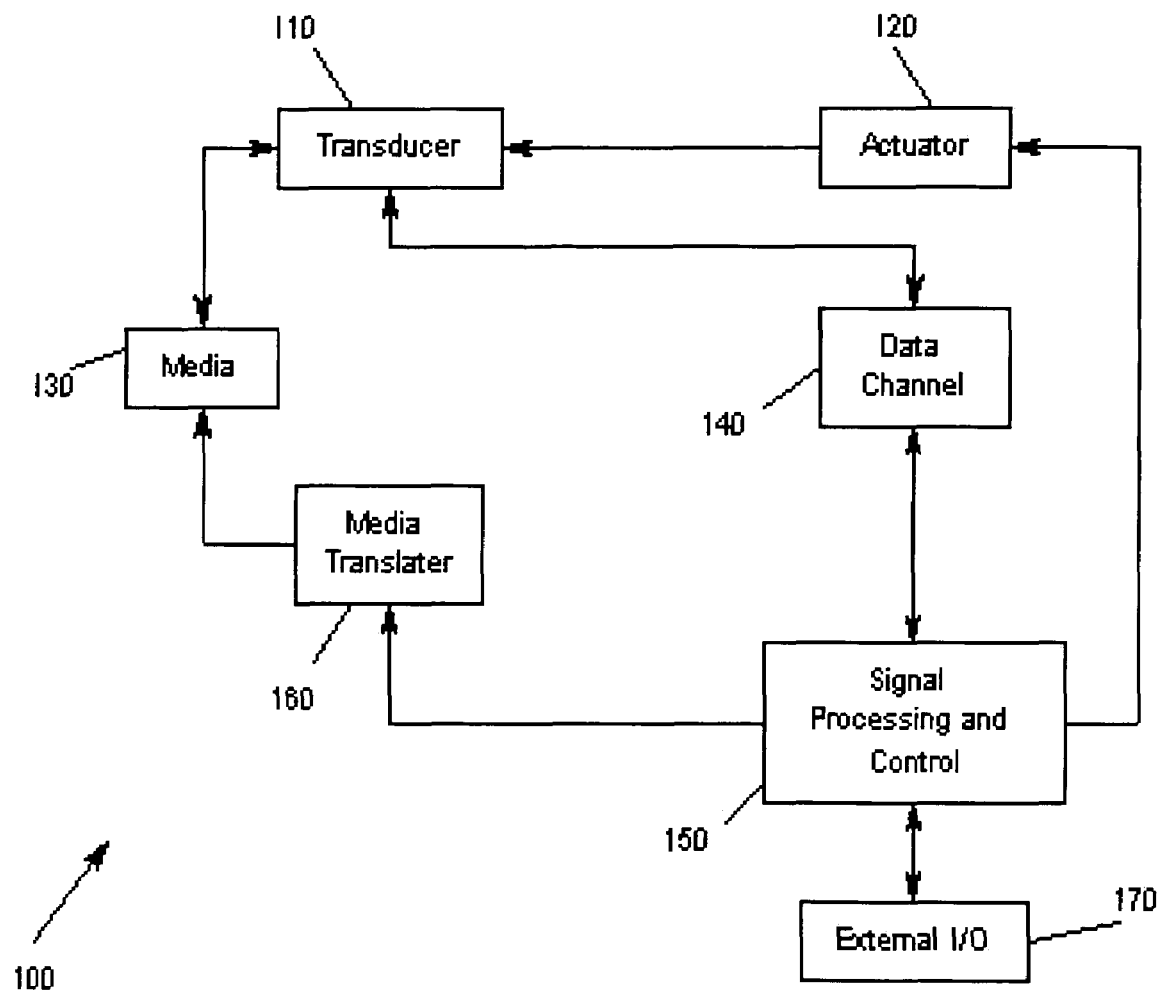
FIG. 1 illustrates a storage system according to an embodiment of the present invention.

FIG. 1 illustrates an exemplary storage system 100 according to the present invention. A transducer 110 is under control of an actuator 120, whereby the actuator 120 controls the position of the transducer 110. The transducer 110 writes and reads data on magnetic media 130. The read/write signals are passed to a data channel 140. A signal processor 150 controls the actuator 120 and processes the signals of the data channel 140 for data exchange with external Input/Output (I/O) 170. I/O 170 may provide, for example, data and control conduits for a desktop computing application, which utilizes storage system 100. In addition, a media translator 160 is controlled by the signal processor 150 to cause the magnetic media 130 to move relative to the transducer 110. The present invention is not meant to be limited to a particular type of storage system 100 or to the type of media 130 used in the storage system 100.

Figure 2:
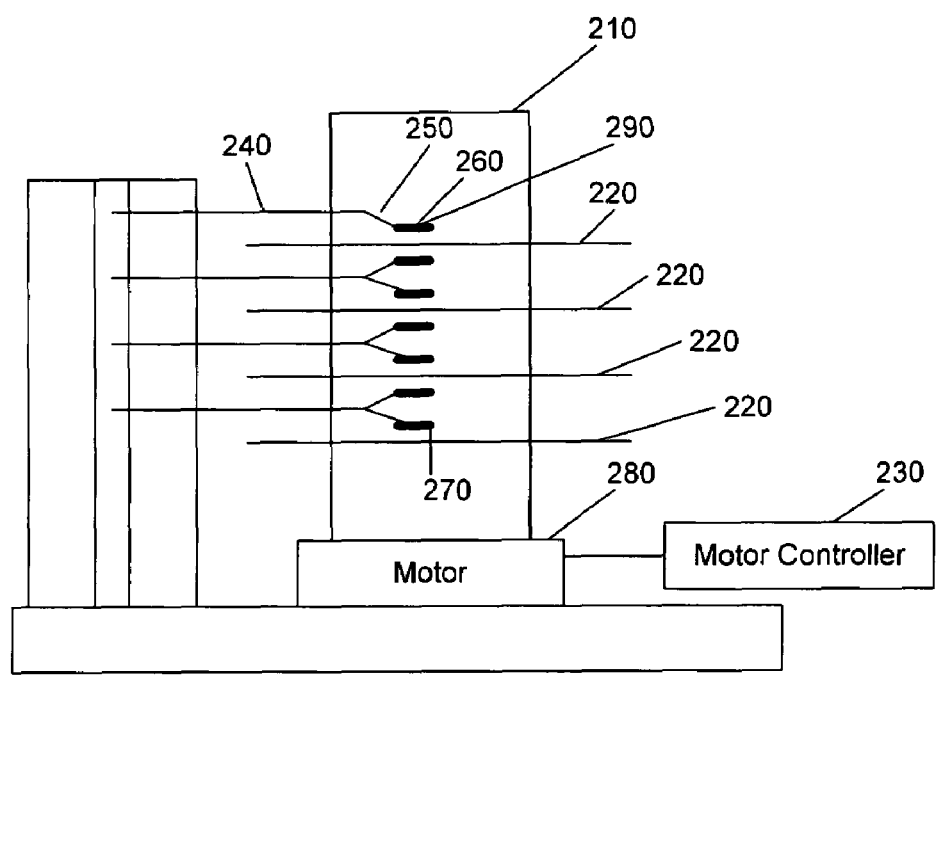
FIG. 2 illustrates one storage system according to an embodiment of the present invention.

FIG. 2 illustrates one particular embodiment of a multiple magnetic disk storage system 200 according to the present invention. In FIG. 2, a hard disk drive storage system 200 is shown. The system 200 includes a spindle 210 that supports and rotates multiple magnetic disks 220. The spindle 210 is rotated by motor 280 that is controlled by motor controller 230. A combined read and write magnetic head 270 is mounted on slider 260 that is supported by suspension 250 and actuator arm 240. Processing circuitry exchanges signals that represent information with read/write magnetic head 270, provides motor drive signals for rotating the magnetic disks 220, and provides control signals for moving the slider 260 to various tracks. Although a multiple magnetic disk storage system is illustrated, a single magnetic disk storage system is equally viable in accordance with the present invention.

The suspension 250 and actuator arm 240 position the slider 260 so that read/write magnetic head 270 is in a transducing relationship with a surface of magnetic disk 220. When the magnetic disk 220 is rotated by motor 280, the slider 260 is supported on a thin cushion of air (air bearing) between the surface of disk 220 and the ABS 290. Read/write magnetic head 270 may then be employed for writing information to multiple circular tracks on the surface of magnetic disk 220, as well as for reading information therefrom.

FIG. 3 illustrates a sensor assembly 300. In FIG. 3, a slider 320 is mounted on a suspension 322. First and second solder connections 302 and 308 connect leads from the sensor 318 to leads 310 and 314, respectively, on suspension 322 and third and fourth solder connections 304 and 306 connect to the write coil (not shown) to leads 312 and 316, respectively, on suspension 322.

FIG. 4 is an ABS view of slider 400 and magnetic head 410. The slider has a center rail 420 that supports the magnetic head 410, and side rails 430 and 460. The support rails 420, 430 and 460 extend from a cross rail 440. With respect to rotation of a magnetic disk, the cross rail 440 is at a leading edge 450 of slider 400 and the magnetic head 410 is at a trailing edge 470 of slider 400.

The above description of a typical magnetic recording disk drive system, shown in the accompanying FIGS. 1–4, is for presentation purposes only. Storage systems may contain a large number of recording media and actuators, and each actuator may support a number of sliders. In addition, instead of an air-bearing slider, the head carrier may be one that maintains the head in contact or near contact with the disk, such as in liquid bearing and other contact and near-contact recording disk drives.

Figure 5:
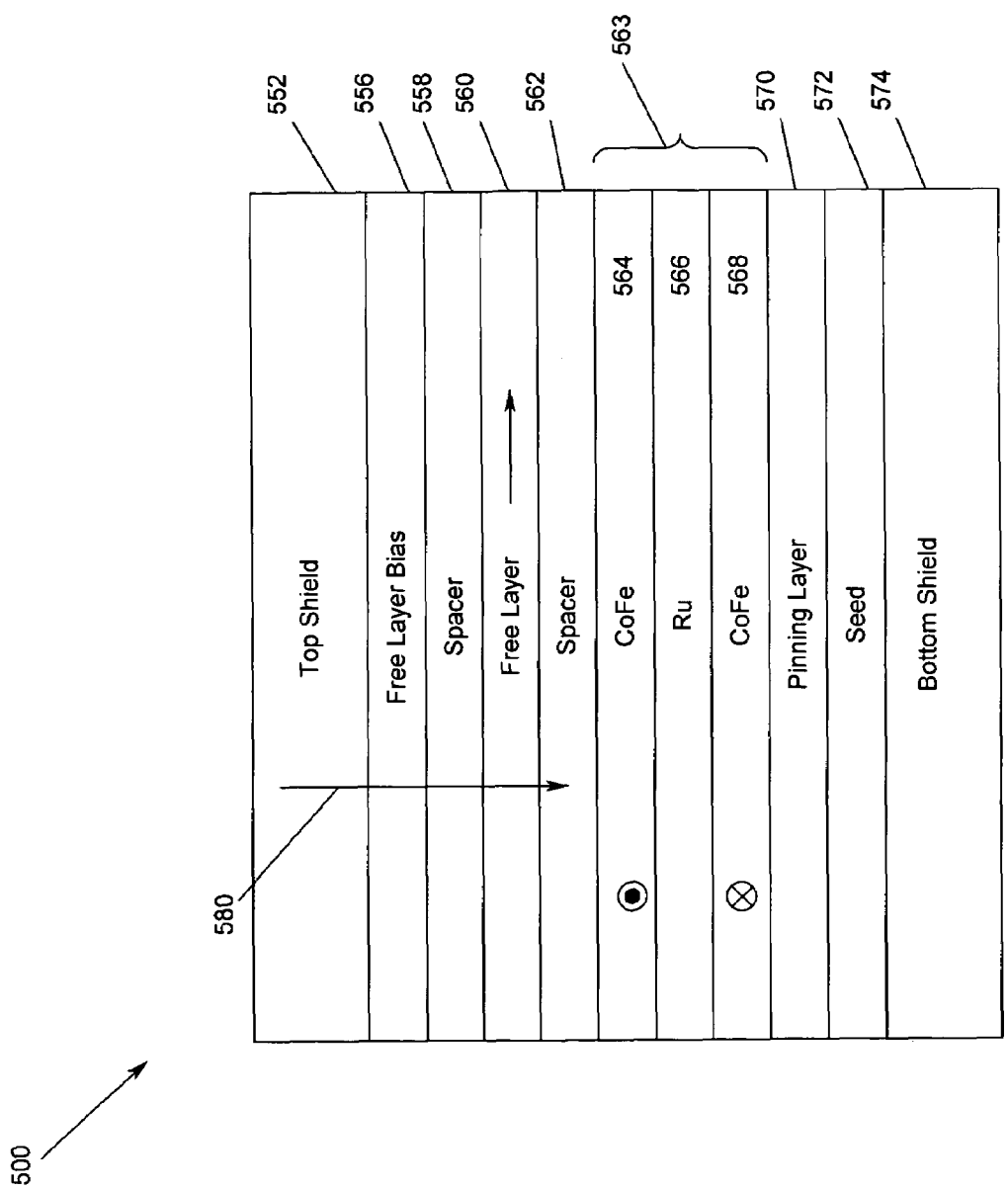
FIG. 5 shows an ABS view of a CPP type of spin valve wherein the current flow is perpendicular to the plane of the free layer.

FIG. 5 shows an ABS view 500 of a conventional CPP type of spin valve, wherein the current flow is perpendicular to the plane of the free layer. Spin valve head 500 includes top shield 552, bias layer 556, spacer layer 558, free layer 560, second spacer layer 562, pinned layer 563, pinning layer 570, seed layer 572 and bottom shield 574. Top shield 552 also acts as a shared pole in merged read/write heads. Bias layer 556 is an antiferromagnetic material, such as IrMn, PtMn, NiMn, etc. Spacer layers 558 and 562 may be formed of Cu, Au, Ag, NiFeCr, Al, Ru, etc. Free layer 560 is a ferromagnetic layer, such as NiFe. The magnetization of free layer 560 is shown by an arrow on that layer. Pinned layer 563 is a synthetic antiferromagnet or SAF, and includes, for example, first CoFe layer 564, Ru spacer layer 566 and second CoFe layer 568.

When two ferromagnetic layers, such as CoFe layers 564 and 568 are separated by a spacer of an appropriate thickness, the two ferromagnetic layers couple strongly with magnetic moments anti-parallel as shown by the circled "X" (into the paper) and circled dot (out of the paper) on these layers. In FIG. 5, a synthetic antiferromagnet is used as pinned layer 563 to provide a reduced demagnetization field for providing magnetic stability. Alternatively, pinned layer 563 could be a single soft magnetic layer, such as CoFe. Pinning layer 570 is an antiferromagnetic material, for example, such as IrMn, PtMn, NiMn, etc.

Top shield 552 and bottom shield 574 act as electrodes for conducting a sense current. The sense current flows between top shield 552 and bottom shield 574 and through layers 556–572. This mode of operation, where the sense current 580 flows perpendicular to the plane of spacer layer 562, is referred to as current perpendicular-to-plane or CPP mode. Operation in CPP mode provides an enhanced GMR response.

CPP GMR heads as shown in FIG. 5 provide an enhanced GMR response compared to current-in-plane (CIP) GMR heads (which would have leads at the sides of at least some of layers 556–572 so that the current would flow between the side leads parallel to the layers 556–572).

Figure 6A:
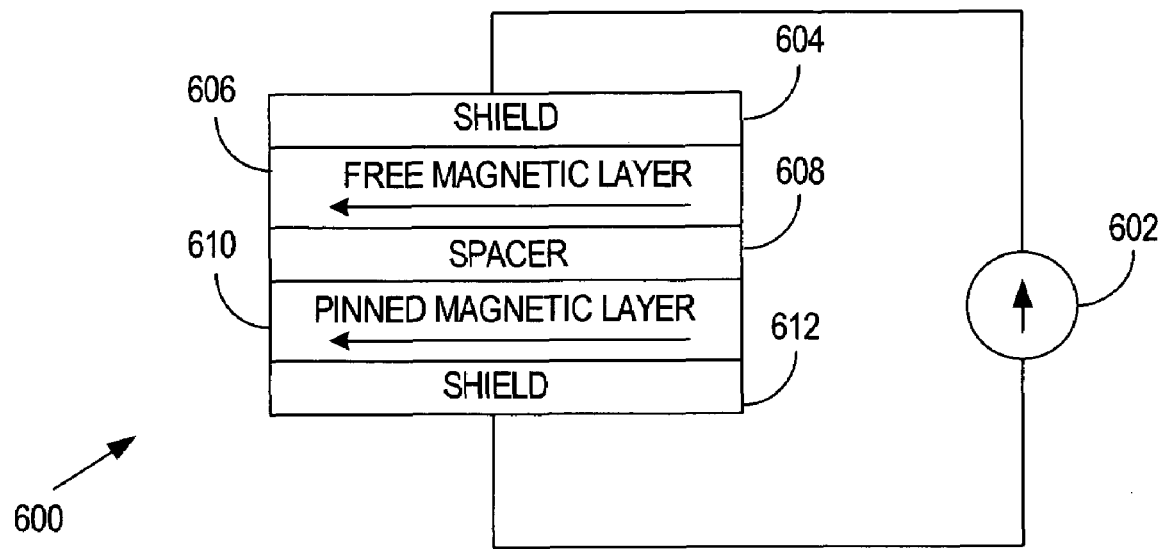
FIGS. 6A and 6B illustrate basic GMR sensor operation.
Figure 6B:
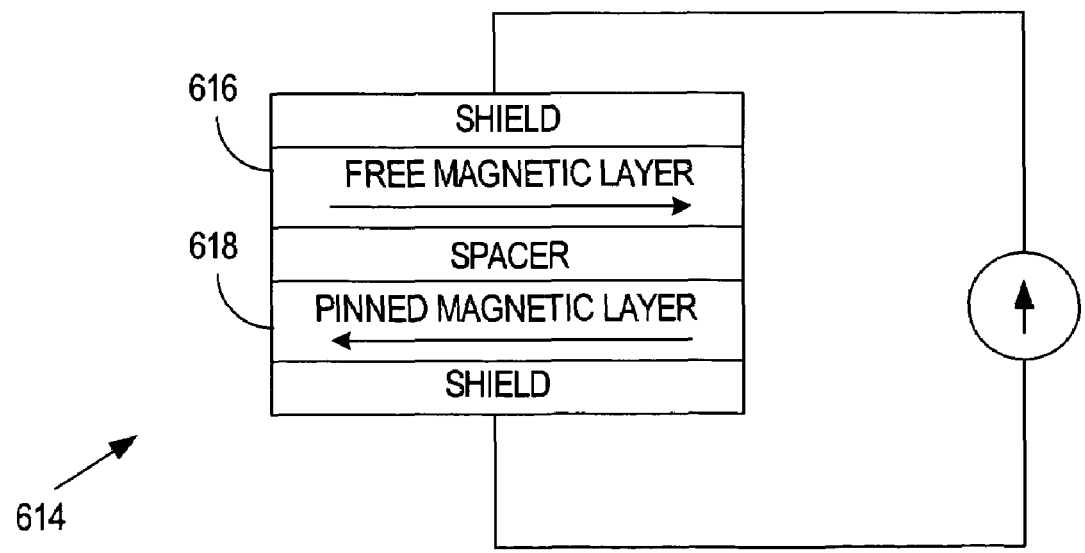

FIG. 6A illustrates basic CPP GMR head 600 that is in a parallel configuration, whereas FIG. 6B illustrates basic CPP GMR head 614 having an anti-parallel configuration. The parallel configuration is defined when the magnetic orientations of the free magnetic layer and the pinned magnetic layer are in the same direction, whereas the anti-parallel configuration is defined when the magnetic orientations of the free magnetic layer and the pinned magnetic layer are in opposite directions. In both configurations, shields 604 and 612 act as terminals that are used to couple to sense current source 602, whereby the sense current passes orthogonally through each surface of the multilayer.

Free magnetic layers 606 and 616, separated by spacer 608, have their respective magnetic orientations set by the magnetic field induced by the magnetic media being read. If a logic "1" has been recorded on the magnetic media, where for example a logic "1" indicates the presence of a magnetic field, then the magnetic orientation of free magnetic layer 606 shown in FIG. 6A may result, thus producing the parallel magnetic configurations of ferromagnetic layers 606 and 610. If a logic "0", on the other hand, has been recorded on the magnetic media, e.g., the lack of a magnetic field, then the anti-parallel magnetic configurations of ferromagnetic layers 616 and 618 as shown in FIG. 6B may result.

The GMR effect can thus be summarized by the relative magnetic orientations of free magnetic layer 606 and 616 to the respective pinned magnetic layers as illustrated by FIGS. 6A and 6B. On the one hand, FIG. 6A represents a parallel magnetic orientation, which results in a low impedance state of CPP GMR 600. Sense current 602 conducted by the low impedance of CPP GMR 600, therefore, results in a low voltage developed across the shield terminals that may be detected by a voltmeter (not shown). On the other hand, the anti-parallel magnetic orientation shown in FIG. 6B, represents a high impedance state of CPP GMR 614, resulting in a high voltage measurement across the shield terminals. Thus, by detecting the voltage differences induced by the relative parallel and anti-parallel magnetic orientations of the free layer and pinned layers, logic values read from the magnetic media may be ascertained.

Figure 7:
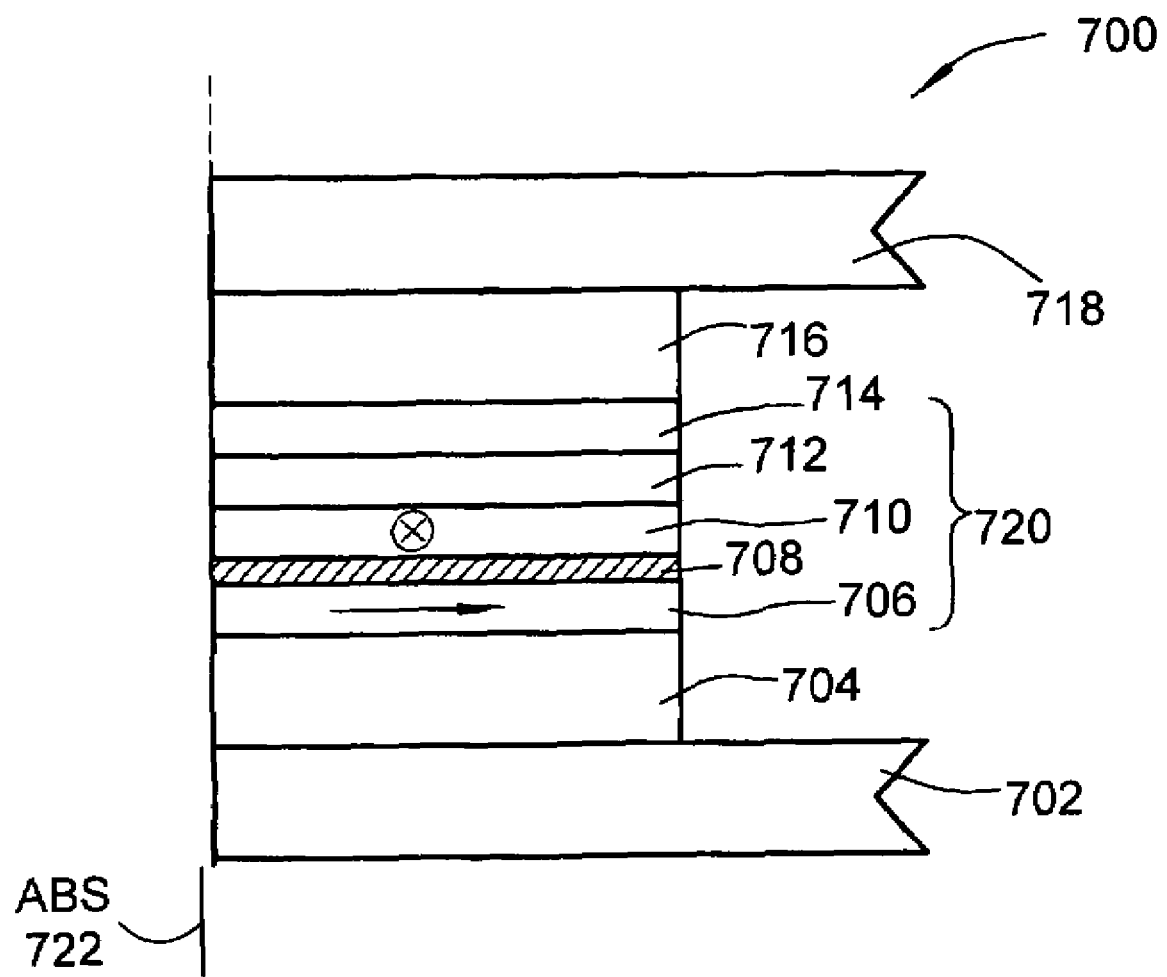
FIG. 7 is a sectional view of a MTJ head.

Another type of magnetic device is a magnetic tunnel junction (MTJ) device or "tunnel valve sensor". FIG. 7 is a sectional view of a MTJ head 700. In FIG. 7, the MTJ head 700 includes a MTJ layered structure 720 sandwiched by a top lead 716 adjacent to a top shield 718 and a bottom lead 704 adjacent to a bottom shield 702. The MTJ layered structure 720 includes a ferromagnetic free layer 706, a ferromagnetic pinned layer 710, an insulating tunnel barrier layer 708 located between the ferromagnetic free layer 706 and the ferromagnetic pinned layer 710, an anti-ferromagnetic layer 712 adjacent to the ferromagnetic pinned layer 710, and a capping layer 714 adjacent to the anti-ferromagnetic layer 712. In the flux guided MTJ head 700, the front edge of the ferromagnetic free layer 706 is exposed at the ABS 722. The front edges of the capping layer 714, the anti-ferromagnetic layer 712, the ferromagnetic pinned layer 710, and the insulating tunnel barrier layer 708 may also be exposed, or alternatively may be recessed from the ABS 723 by an insulation layer (not shown).

The tunnel barrier layer 708 is sufficiently thin that quantum-mechanical tunneling of charge carriers occurs between the ferromagnetic layers 706, 710. The tunneling process is electron spin dependent, which means that the tunneling current across the junction 708 depends on the spin-dependent electronic properties of the ferromagnetic materials 706, 710 and is a function of the relative orientation of the magnetic moments, or magnetization directions, of the two ferromagnetic layers 706, 708. When an electric potential is applied between the two ferromagnetic layers 706, 710, the sensor resistance is a function of the tunneling current across the insulating layer 708 between the ferromagnetic layers 706, 710. Since the tunneling current that flows perpendicularly through the tunnel barrier layer 708 depends on the relative magnetization directions of the two ferromagnetic layers 706, 710, recorded data can be read from a magnetic medium because the signal field causes a change of direction of magnetization of the free layer 706, which in turn causes a change in resistance of the MTJ sensor and a change in the sensed current or voltage.

Figure 8:
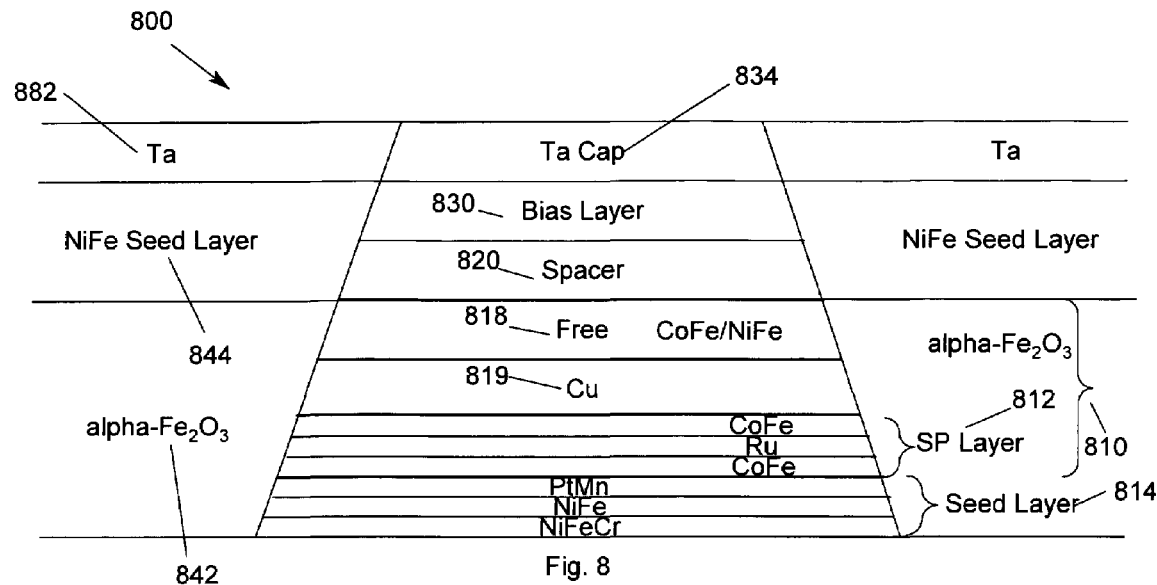
FIG. 8 illustrates a CPP GMR/tunnel valve (TV) sensor, wherein the sensor stack has a thickness that is reduced according to an embodiment of the present invention.

However, as mentioned earlier, to meet targeted giant magneto-resistive (GMR) head aerial density requirements, new ways to make the sensor thinner, shorter and narrower are needed. FIG. 8 illustrates a CPP GMR/tunnel valve (TV) sensor 800, wherein the sensor stack has a thickness that is reduced according to an embodiment of the present invention. In FIG. 8, a seed layer 814 is formed. For example, the seed layer 814 may include a NiFeCr layer, a NiFe layer and a PtMn layer. The sensor stack 810 includes a free layer 818, a copper spacer 819 and a pinned layer 812. The pinned layer 812 is implemented using two ferromagnetic layers and an interlayer. For example, the ferromagnetic layers may be CoFe layers and the interlayer may be a Ru layer. A spacer 820 is formed over the sensor stack 810. A bias layer 830 is formed over the spacer 820 and a layer of Tantalum 834 is formed over the bias layer 830. Adjacent to the active areas, a layer of alpha-$Fe_2O_3$ 842 is formed. A NiFe seed layer 844 is formed over the layer of alpha-$Fe_2O_3$ 842. The layer of Tantalum 882 also covers the NiFe seed layer 844.

Figure 9:
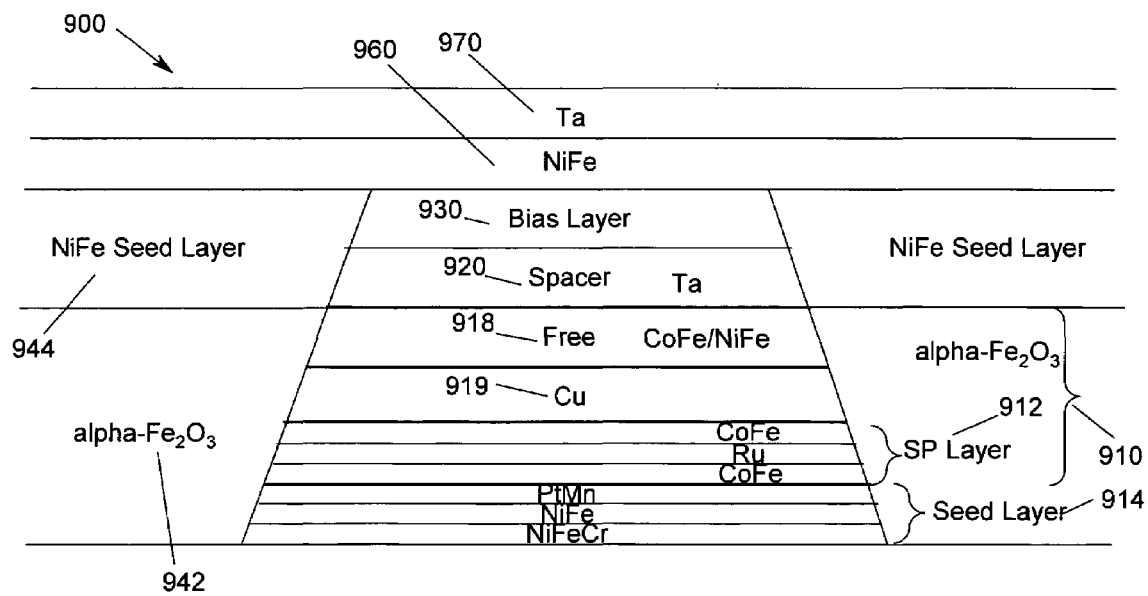
FIG. 9 illustrates the completed GMR/tunnel valve (TV) sensor with the reduced thickness of the sensor stack according to an embodiment of the present invention.

FIG. 9 illustrates the completed GMR/tunnel valve (TV) sensor 900 with the reduced thickness of the sensor stack according to an embodiment of the present invention. In FIG. 9, a seed layer 914 is formed. The GMR/tunnel valve (TV) sensor 900 includes a sensor stack 910 having a free layer 918, a copper spacer 919 and a pinned layer 912. A spacer 920 is formed over the sensor stack 910. In FIG. 9, the Tantalum layer 882, 834, shown in FIG. 8, is removed using, for example, reactive ion etching. Then, a coupling layer 960 is formed over the bias layer 930 and the NiFe seed layer 944. A cap 970 is formed over the coupling layer 960. The bias layer 930 is pinned by the alpha-$Fe_2O_3$ layer 942, which has a high coercivity. For narrow track widths, the bias layer 930/960 attains pinning by exchange coupling between the bias layer in the active area 930 and passive areas 960.

Figure 10:
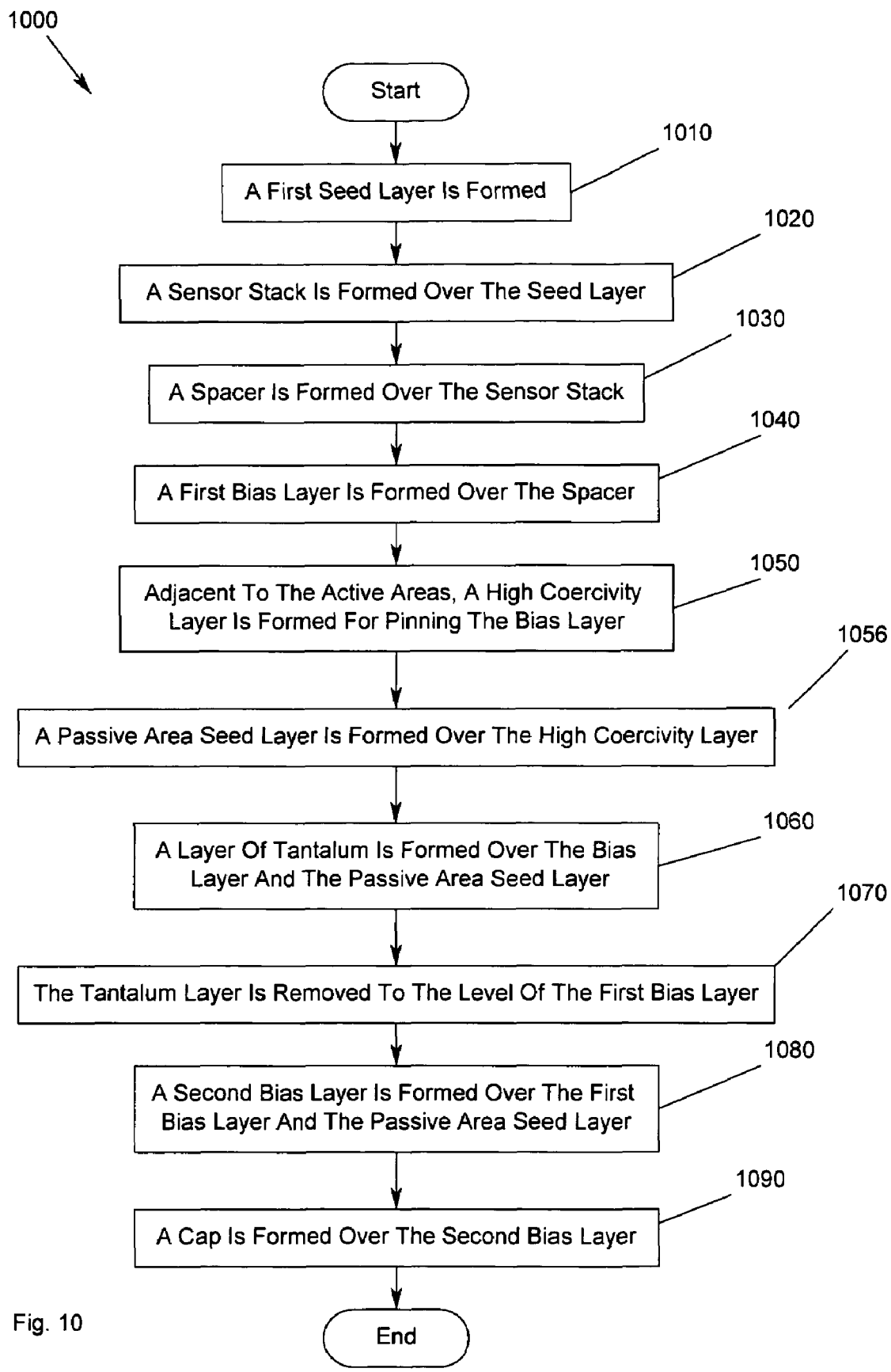
FIG. 10 is a flow chart of the method for reducing the thickness of a sensor stack in a current-perpendicular-to-plane (CPP) GMR/tunnel valve (TV) sensor.

FIG. 10 is a flow chart 1000 of the method for reducing the thickness of a sensor stack in a current-perpendicular-to-plane (CPP) GMR/tunnel valve (TV) sensor. A seed layer is formed 1010 and then the sensor stack, which includes a free layer, a spacer and a pinned layer, is formed over the seed layer 1020. The pinned layer may be implemented using two ferromagnetic layers and an interlayer. A spacer is formed over the sensor stack 1030. A bias layer is formed over the spacer 1040. Adjacent to the active areas, a high coercivity layer, e.g., alpha-$Fe_2O_3$, is formed for pinning the bias layer 1050. A NiFe seed layer is formed over the layer of alpha-$Fe_2O_3$ 1056. A layer of Tantalum is formed over the bias layer and the NiFe seed layer 1060. The Tantalum layer is removed 1070 and a second bias layer is formed over the first bias layer and the NiFe seed layer 1080. A cap is formed over the second bias layer 1090.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A current-perpendicular-to-plane (CPP) GMR/tunnel valve (TV) sensor, comprising:
   a sensor stack having a free layer forming an active area;
   a spacer layer formed over a top surface of the free layer of the sensor stack;
   a biasing layer disposed on and in contact with a top surface of the spacer; and
   a high coercivity layer formed without contact with the biasing layer and adjacent the sensor stack for pinning the biasing layer, the biasing layer maintaining a direction of magnetization in the free layer until influenced by a readback field.

2. The CPP GMR/TV sensor of claim 1, wherein the high coercivity layer comprises an alpha-$Fe_2O_3$ layer.

3. The CPP GMR/TV sensor of claim 1 further comprising a seed layer disposed over the high coercivity layer and a coupling layer disposed over the bias layer and the seed layer.

4. The CPP GMR/TV sensor of claim 3, wherein the seed layer comprises a NiFe seed layer, the high coercivity layer comprises an alpha-$Fe_2O_3$ layer formed adjacent the sensor stack in a passive area and the coupling layer comprises NiFe layer.

5. The CPP GMR/TV sensor of claim 1, wherein the sensor stack comprises a pinned layer, a spacer layer and the free layer.

6. The CPP GMR/TV sensor of claim 5, wherein the pinned layer comprises a first CoFe layer, a Ru layer and a second CoFe layer.

7. The CPP GMR/TV sensor of claim 5, wherein the free layer comprises an alloy layer comprising CoFe and NiFe.

8. The CPP GMR/TV sensor of claim 5, wherein the sensor stack further comprises a sensor stack seed layer, the pinned layer being formed on the seed layer.

9. The CPP GMR/TV sensor of claim 8, wherein the sensor stack seed layer comprises a NiFeCr layer, a NiFe layer and a PtMn layer.

10. The CPP GMR/TV sensor of claim 1, wherein the bias layer is pinned by exchange coupling between the bias layer and the high coercivity layer.

11. A magnetic storage system, comprising:
    a magnetic storage medium having a plurality of tracks for recording of data; and
    a CPP GMR/TV sensor maintained in a closely spaced position relative to the magnetic storage medium during relative motion between the magnetic transducer and the magnetic storage medium, the CPP GMR/TV sensor further comprising:
    a sensor stack having a free layer forming an active area;
    a spacer layer formed over a top surface of the free layer of the sensor stack;
    a biasing layer disposed on and in contact with a top surface of the spacer; and
    a high coercivity layer formed without contact with the biasing layer and adjacent the sensor stack for pinning the biasing layer, the biasing layer maintaining a direction of magnetization in the free layer until influenced by a readback field.

12. The CPP GMR/TV sensor of claim 11, wherein the high coercivity layer comprises an alpha-$Fe_2O_3$ layer.

13. The CPP GMR/TV sensor of claim 11 further comprising a seed layer disposed over the high coercivity layer and a coupling layer disposed over the bias layer and the seed layer.

14. The CPP GMR/TV sensor of claim 13, wherein the seed layer comprises a NiFe seed layer, the high coercivity layer comprises an alpha-$Fe_2O_3$ layer formed adjacent the sensor stack in a passive area and the coupling layer comprises NiFe layer.

15. The CPP GMR/TV sensor of claim 11, wherein the sensor stack comprises a pinned layer, a spacer layer and the free layer.

16. The CPP GMR/TV sensor of claim 15, wherein the pinned layer comprises a first CoFe layer, a Ru layer and a second CoFe layer.

17. The CPP GMR/TV sensor of claim 15, wherein the free layer comprises an alloy layer comprising CoFe and NiFe.

18. The CPP GMR/TV sensor of claim 15, wherein the sensor stack further comprises a sensor stack seed layer, the pinned layer being formed on the seed layer.

19. The CPP GMR/TV sensor of claim 18, wherein the sensor stack seed layer comprises a NiFeCr layer, a NiFe layer and a PtMn layer.

20. The CPP GMR/TV sensor of claim 11, wherein the bias layer is pinned by exchange coupling between the bias layer and the high coercivity layer.

21. A method for reducing the thickness of a sensor stack in a current-perpendicular-to-plane (CPP) GMR/tunnel valve (TV) sensor, comprising:
   forming a sensor stack seed layer;
   forming, over the sensor stack seed layer, a sensor stack having a free layer, a spacer and a pinned layer;
   forming a spacer layer over the free layer of the sensor stack;
   forming a biasing layer over the spacer; and
   adjacent to the sensor stack, forming a high coercivity layer for pinning the bias layer;
   forming a passive area seed layer over the high coercivity layer;
   forming a layer of Ta over the bias layer and the passive area seed layer;
   removing the Ta layer even with the bias layer;
   forming, over the bias layer and the passive area seed layer, a coupling layer for pinning the biasing layer, the biasing layer maintaining a direction of magnetization in the free layer until influenced by a readback field; and
   forming a cap over the coupling layer.

* * * * *